(12) United States Patent
Johnson et al.

(10) Patent No.: US 6,400,379 B1
(45) Date of Patent: Jun. 4, 2002

(54) METHOD AND APPARATUS FOR SELECTIVELY DISPLAYING ADDITIONAL INFORMATION RELATING TO BROADCAST INFORMATION

(75) Inventors: Steve Johnson; Marvin Carlberg; Bill Tompkins; Tracy Bader, all of Burbank, CA (US)

(73) Assignee: Pioneer Digital Technologies, Inc., Burbank, CA (US)

( * ) Notice: Subject to any disclaimer, the term of this patent is extended or adjusted under 35 U.S.C. 154(b) by 0 days.

(21) Appl. No.: 08/978,027

(22) Filed: Nov. 25, 1997

(51) Int. Cl.[7] ................................................ G06K 15/00
(52) U.S. Cl. ....................... 345/721; 345/790; 345/851
(58) Field of Search ................................. 345/343, 344, 345/345, 348, 340, 346, 342, 327, 328, 356, 357, 850–851, 790, 792, 794, 798, 808, 712, 721, 720, 739

(56) References Cited

U.S. PATENT DOCUMENTS

| | | | |
|---|---|---|---|
| 4,706,121 A | | 11/1987 | Young |
| 4,977,455 A | | 12/1990 | Young |
| 5,151,789 A | | 9/1992 | Young |
| 5,353,121 A | | 10/1994 | Young et al. |
| 5,479,266 A | | 12/1995 | Young et al. |
| 5,479,268 A | | 12/1995 | Young et al. |
| 5,532,754 A | | 7/1996 | Young et al. |
| 5,826,051 A | * | 10/1998 | Porter et al. ................. 345/345 |
| 5,880,725 A | * | 3/1999 | Southgate .................... 345/340 |
| 5,933,141 A | * | 8/1999 | Smith .......................... 345/339 |
| 5,999,191 A | * | 12/1999 | Frank et al. ................. 345/435 |
| 6,002,397 A | * | 12/1999 | Jaaskelainen, Jr. .......... 345/340 |
| 6,016,144 A | * | 1/2000 | Blonstein et al. ........... 345/342 |

\* cited by examiner

*Primary Examiner*—Steven Sax
(74) *Attorney, Agent, or Firm*—Sughrue Mion, PLLC (57) ABSTRACT

An apparatus for displaying a primary display and a window containing additional information is provided. The apparatus contains a display device, a displaying mechanism, and an exposing mechanism. The display device has a screen, and the displaying mechanism displays the primary display on the screen. The exposing mechanism generates and displays the window containing the additional information on the screen such that the window is located underneath the primary display while the primary display is displayed on the screen and is exposed by removing the primary display from on top of the window. A method which is performed by the apparatus is also provided.

82 Claims, 9 Drawing Sheets

Opaque

FIG. 9

Transparent

FIG. 10

METHOD AND APPARATUS FOR SELECTIVELY DISPLAYING ADDITIONAL INFORMATION RELATING TO BROADCAST INFORMATION

FIELD OF THE INVENTION

The present invention relates to an apparatus for selectively displaying additional information relating to program information and to a method employed by the apparatus. More particularly, the invention relates to an apparatus and method for displaying information relating to program information and contained in a window which is located "underneath" or "beside" the program information and which can be selectively displayed. The present invention may be illustratively embodied in a cable television system in which a detailed description of a particular program is contained in a window that is located underneath or beside an actual broadcast program, a menu, or other type of screen displayed on a television and which can be exposed when a viewer inputs an appropriate command to the system.

BACKGROUND OF THE INVENTION

Figure 7:
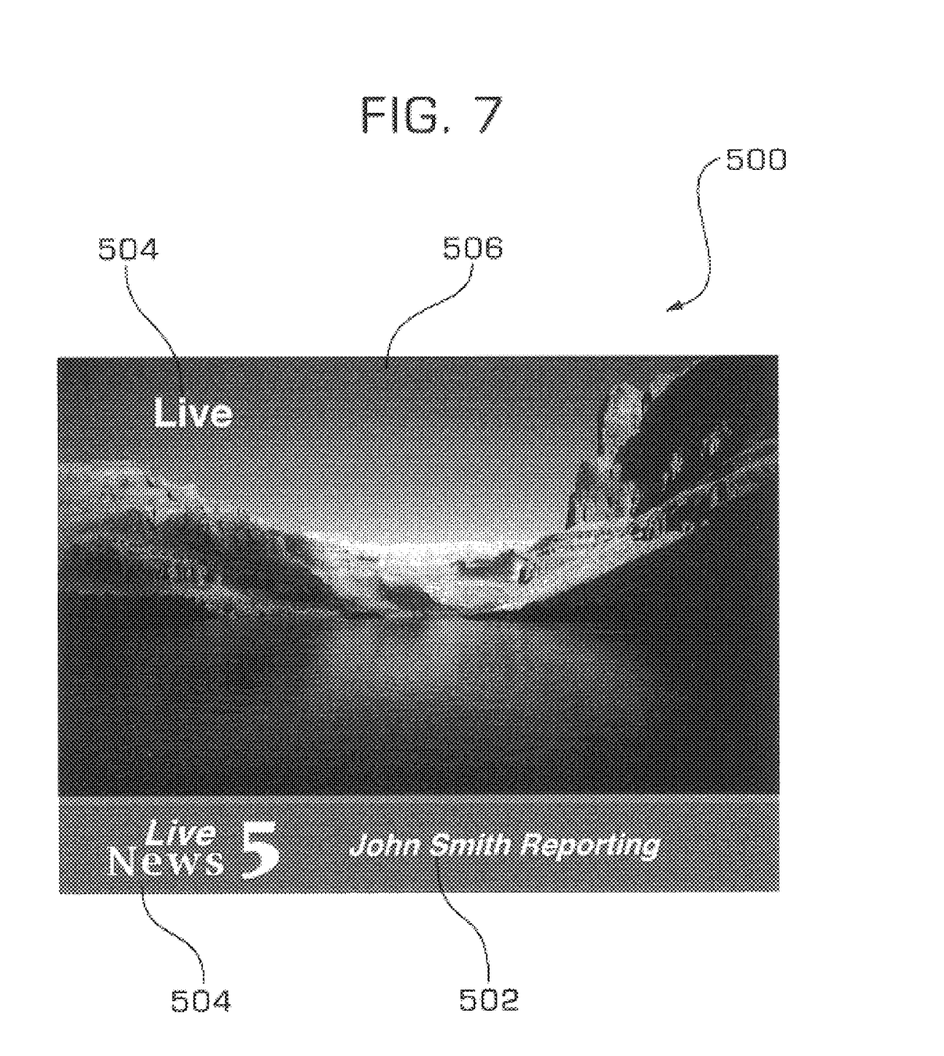
FIG. 7 illustrates a composite picture in which a television announcer's name and other related information are superimposed upon a broadcast program.

Early developments in television technology have been made to enable television systems to combine two or more types of media (e.g. text, graphics, video, etc.) and display the combined media as a single composite picture. The composite picture generated by such systems may include the names of television announcers, news flashes, or emergency broadcast messages superimposed over a television broadcast program. An example of a typical composite picture 500 in which a television announcer's name 502 and other related information 504 are superimposed upon a broadcast program 506 is shown in FIG. 7. More recent examples of forming a composite picture from two or more types of media include seemlessly blending animated text and graphics into a video program in order to present the illusion that human beings are interacting with cartoon characters.

Superimposing additional information on broadcast programs becomes significantly more difficult if the information needs to be combined with a live broadcast program. In such case, the additional information must be superimposed on the program in real-time so that the composite picture is generated as the live television program is being broadcast. In order to combine the various media in real-time, studio facilities have been created, and producers in such facilities have to closely monitor the live broadcast program and superimpose the additional information "on the fly" to ensure that the information appropriately corresponds to the subject matter of the program currently being broadcast. However, creating a live composite broadcast program via the studio facilities is labor intensive and expensive.

The display of additional information becomes more complicated when the information is to be displayed only when it is requested by a user. Such information is customarily called information "on-demand". In this interactive case, the additional information is typically computer generated broadcast data that is synchronized with a corresponding video signal via a timer and is hidden from the user until it is requested. As a result, the information does not obscure or hide portions of the television screen when the user does not wish to view it.

An example of displaying information "on-demand" may occur during a sports broadcast program. As the user is watching the sports program, he or she may press a button on a remote control to request the score of the televised sporting event to be displayed, even when the producer of the sports program has decided not to display it. When the button is pressed, a graphic overlay containing the score is superimposed over the sports program.

One of the problems that exists with displaying additional information "on-demand" or as part of a composite broadcast picture is determining how to display the information on the screen together with the program. In the past, the additional information has been displayed in various manners.

Figure 8:
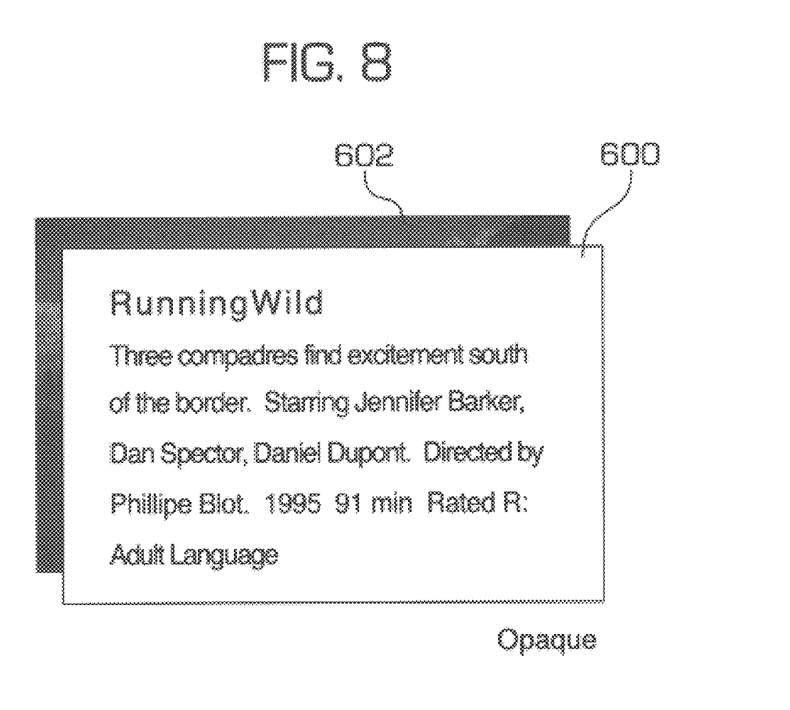
FIG. 8 illustrates an opaque window which is overlaid upon a broadcast program and contains additional information.
Figure 9:
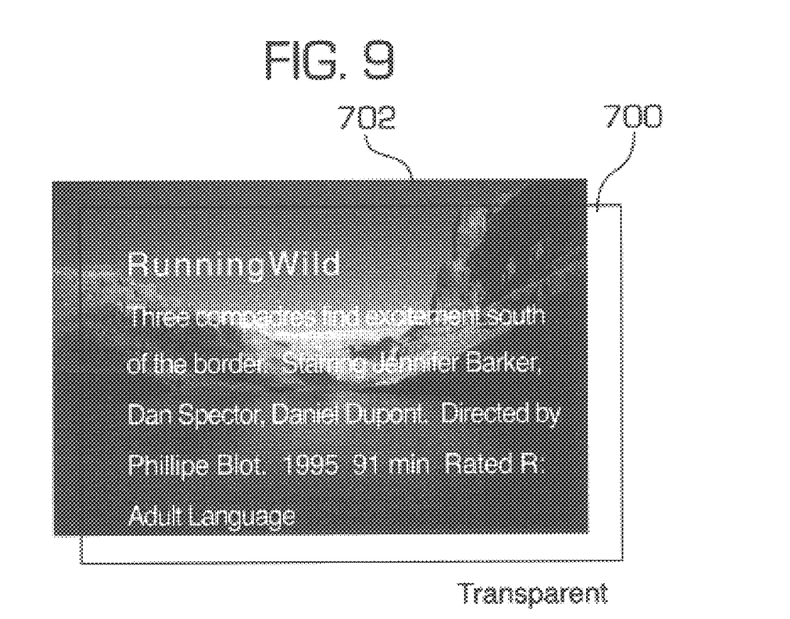
FIG. 9 illustrates a transparent window which is overlaid upon a broadcast program and contains additional information.

For instance, the information may simply be provided in an opaque window 600 over the broadcast program 602 as shown in FIG. 8. However, overlaying the opaque window 600 upon the program 602 hides a portion of the program 602 and thus, is not aesthetically pleasing to the user. In order to attempt to overcome the above disadvantages, some systems have displayed the information in a transparent or semi-transparent window 700 that is overlaid upon the broadcast program 702 as shown in FIG. 9. However, displaying the additional information in such manner often creates visual conflicts between the additional information and the program 702 and is confusing to the user. Similarly, the additional information has been superimposed upon the program in a moving transparent window to give the illusion that information is displayed on a transparent "ticker tape". In such case, the information still conflicts with the broadcast program, and the movement of the information across the screen is distracting to the user.

Figure 10:
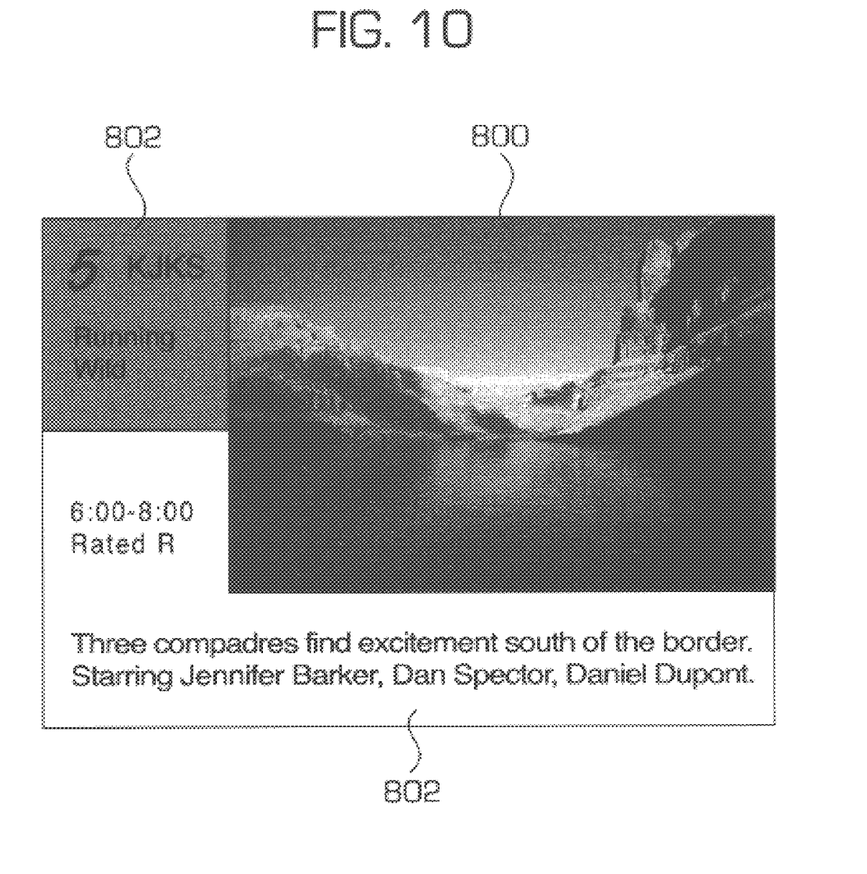
FIG. 10 illustrates a television screen in which the broadcast picture is compressed in size to occupy only a portion of the screen and the remaining portions of the screen are used to display additional information.

In addition to the methods above, the additional information may be displayed as shown in FIG. 10. In the figure, the broadcast program 800 is compressed in size to occupy only a portion of the screen, and the remaining portions 802 of the screen are used to display the additional information. Although this display method has some advantages, the broadcast program 800 must be compressed to display the additional information, and thus, fine visual details which are intended to be displayed when the program is broadcast on the entire screen may not be perceivable by the user.

Accordingly, a need exists for a new method and apparatus for displaying additional information on a television which is aesthetically pleasing to the user.

SUMMARY OF THE INVENTION

In order to overcome the problems above, an object of the present invention is to provide a new method and apparatus for displaying additional information on a television which is aesthetically pleasing to the user.

To accomplish the above object, an apparatus for displaying a primary display and a window containing additional information is provided. The apparatus comprises a display device, a displaying means, and an exposing means. The display device has a screen, and the displaying means displays the primary display on the screen. The exposing means generates and displays the window containing the additional information on the screen such that the window is located underneath the primary display while the primary display is displayed on the screen and is exposed by removing the primary display from on top of the window.

To further accomplish the above object, a method for displaying a primary display and a window containing additional information is provided. In the method, a primary display is displayed on a screen of a display, and a window containing the additional information is generated. The window is displayed on the screen such that the window is located underneath the primary display while the primary display is displayed on the screen and is exposed by removing the primary display from on top of the window.

BRIEF DESCRIPTION OF THE DRAWINGS

The above objects and advantages of the present invention will become more apparent by referring to the detailed description of the preferred embodiments and the corresponding drawings in which.

DETAILED DESCRIPTION OF THE PREFERRED EMBODIMENTS

The following description of the preferred embodiments discloses specific configurations, components, graphic arrangements, etc. However, the preferred embodiments are merely examples of the present invention, and thus, the specific components and graphic arrangements described below are only used to more easily describe such embodiments and to provide an overall understanding of the present invention. Accordingly, one skilled in the art will readily recognize that the present invention is not limited to the specific components and values described below. Furthermore, the descriptions of various features and structures of the present invention which would be known to one skilled in the art are omitted for the sake of clarity and brevity.

Figure 1:
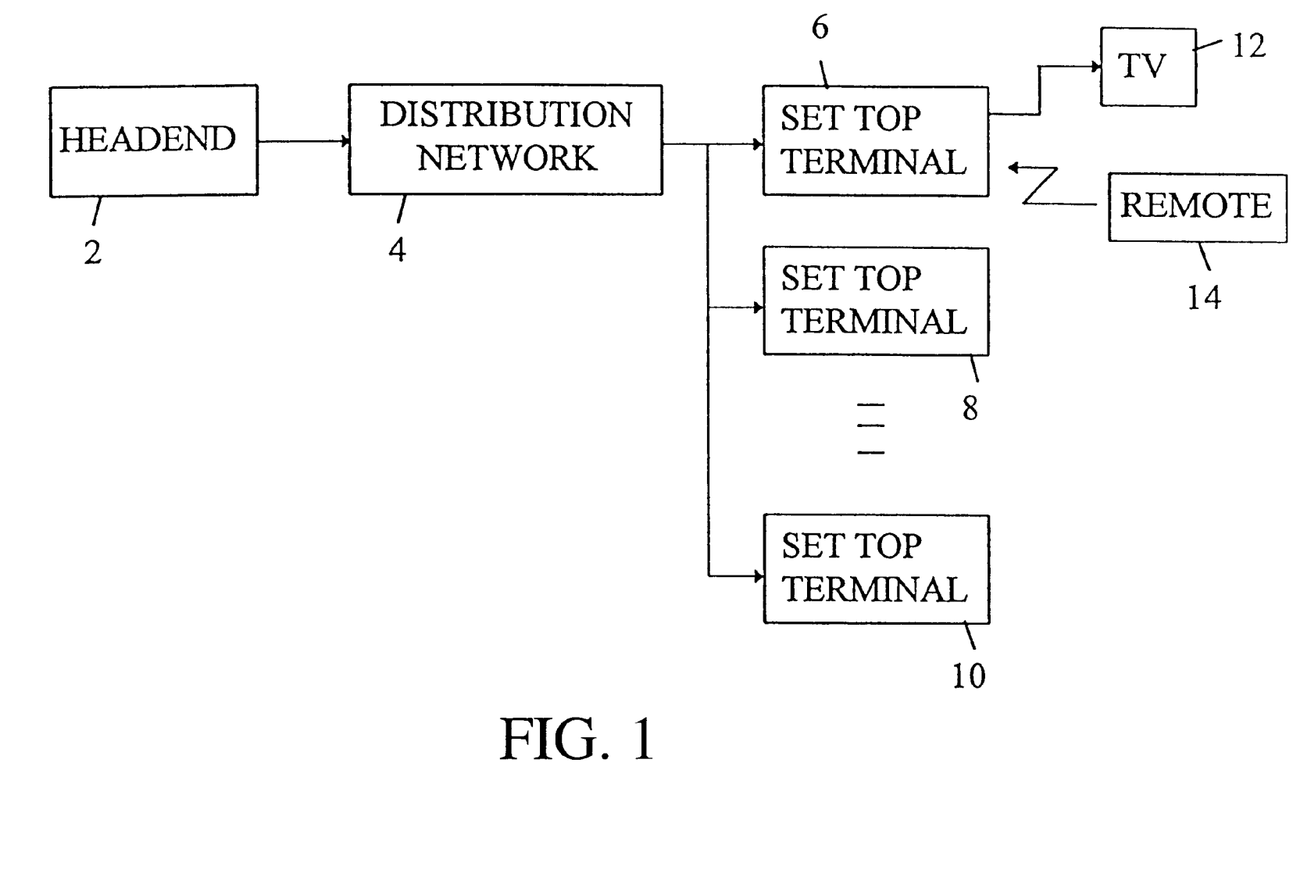
FIG. 1 is a block diagram of a cable television system.

Broadcast systems (e.g. cable television systems) have been designed to broadcast information (e.g. television programs) to the homes of many subscribers. As shown in FIG. 1, a typical cable television system contains a cable headend 2, a distribution network 4, and a plurality of set top terminals 6, 8, and 10. The set top terminals 6, 8, and 10 are respectively located in various user stations (e.g. homes, offices, hotels, etc.), and a television 12 is attached each one of the terminals 6, 8, and 10. (For the sake of clarity, FIG. 1 only shows one television 12 attached to the set top terminal 6).

The headend 2 receives television programming from external sources (i.e. satellite broadcasts, cable broadcasts, magnetic tapes, laser discs, etc.) and/or generates television programming locally, and the programming is output to the distribution network 4. The headend 2 also receives digital data from external sources and/or generates such data locally, and the data is likewise output to the distribution network 4. The digital data may be inserted into and transmitted with the television programming. If the programming corresponds to analog television signals, the digital data may be inserted into the vertical blanking interval of the signals. On the other hand, if the programming corresponds to digital television signals, the digital data may be inserted into the signal in a multiplex fashion. Alternatively or additionally, the digital data may be transmitted to the distribution network 4 in parallel with the television programming on a separate dedicated frequency. The data may contain schedule information corresponding to various current and future broadcast programs as well as other types of data.

Figure 2:
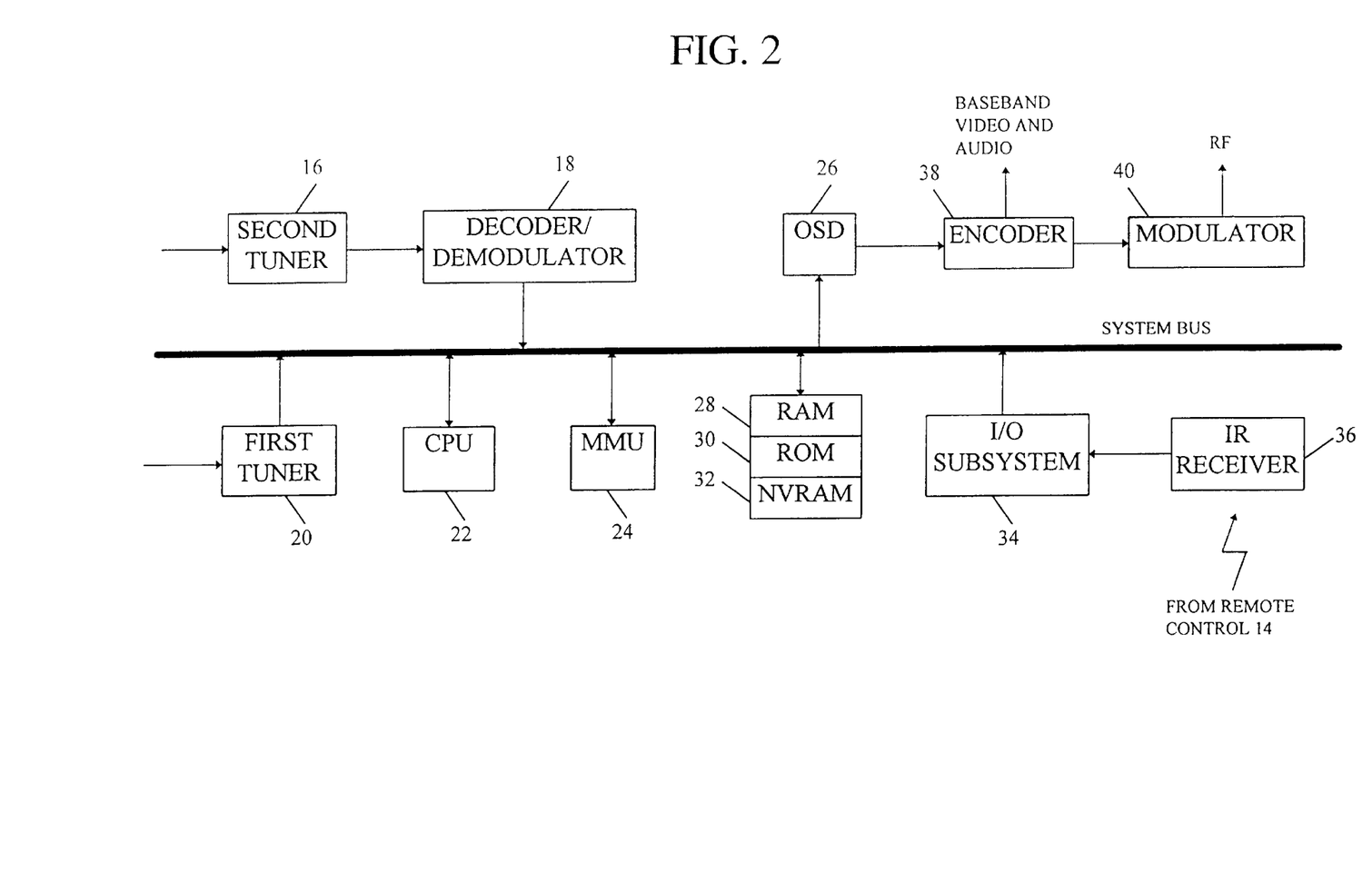
FIG. 2 is an example of a set top terminal contained in the cable television system illustrated in FIG. 1.

The distribution network 4 outputs the television programming and digital data to the set top terminals 6, 8, and 10 which process the information. An illustrative embodiment of a set top terminal is shown in FIG. 2 and contains first and second tuners 16 and 20, a decoder/demodulator 18, a central processing unit ("CPU") 22, a memory management unit ("MMU") 24, a random access memory ("RAM") 28, a read only memory ("ROM") 30, and a non-volatile RAM ("NVRAM") 32.

The first tuner 20 is tuned to a dedicated channel on which the digital data containing the schedule information is transmitted. In an illustrative example, the schedule information contains the channel on which each of the available television programs will be broadcast, the time period during which each program will be broadcast, and the title of each program. Also, the schedule information contains a detailed program description for each program and a category which classifies each program. Once the schedule information is received by the tuner 20, the CPU 22 stores it in the RAM 28.

The second tuner 16 receives a plurality of broadcast programs transmitted on a plurality of channels and selectively tunes to a particular channel based on a tuning control signal output from the CPU 22. Furthermore, various information such as event code information may be embedded or otherwise incorporated in a broadcast program. The event code information identifies the program in which it is contained and is extracted from the program when the program is tuned by the tuner 16. Then, the information is stored in the NVRAM 32, periodically transmitted back to the head end 2 via a reverse data channel (not shown), and used for viewer programming statistics and billing purposes.

As noted above, schedule information may be additionally or alternatively incorporated into the broadcast programs which are input by the tuner 16. In such case, the information is extracted from the tuned programs and stored in the RAM 28. Thus, the first tuner 20 is not required to input the schedule information and may be omitted from the set top terminal.

The broadcast program tuned by the tuner 16 is output to the decoder/demodulator 18. If the broadcast program corresponds to an analog video signal, the decoder/demodulator 18 decodes the signal via a particular process (e.g. an NTSC decoding process), and the decoded signal is converted into a digital signal via an analog/digital converter (not shown). On the other hand, if the broadcast program corresponds to a digital video signal, the decoder/demodulator 18 demodulates the signal via a certain process (e.g. a QAM demodulation process), and the demodulated signal is decompressed via a certain procedure (e.g. an MPEG-2 decompression procedure).

The video signal output from the decoder/demodulator 18 is supplied to an encoder 38 via an on screen display ("OSD") circuit 26 and encoded into an encoded signal via a certain process (e.g. an NTSC or PAL encoding process). Then, the encoded signal can be output as a baseband signal or modulated into an RF signal by a modulator 40 and output to the television 12.

An input/output ("I/O") subsystem 34, infrared ("IR") receiver 36, and the remote control 14 are provided to enable a user to input various commands to the set top terminal to instruct it to operate in a desired fashion. For example, if the user wishes to change the channel to which the second tuner 16 is tuned, he or she can press a certain button or buttons on the remote control 14, and the remote control 14 outputs a distinct IR signal. The IR receiver 36 inputs the IR signal and outputs a corresponding signal to the I/O subsystem 34. The subsystem 34 processes the signal and outputs a channel changing signal to the CPU 22, and the CPU 22 supplies a tuning control signal to the second tuner 16 to instruct it to tune to the appropriate channel.

While watching a broadcast program on a television 12, the user can also display an electronic program guide ("EPG") containing program listings and other information for current and future broadcast programs. To activate the EPG while watching a program, the user presses the GUIDE button on the remote control 14. As a result, the CPU 22 searches through the RAM 28, extracts the relevant schedule information, and outputs such information to the OSD circuit 26 so that it can be displayed on the television 12.

Figure 3A:
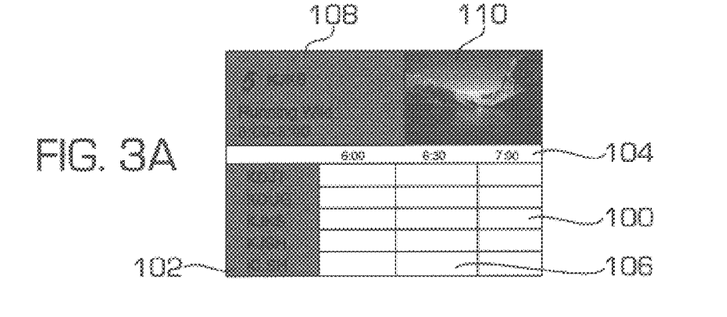
FIG. 3A illustrates an electronic program guide ("EPG") displayed via the set top terminal shown in FIG. 2.

In the illustrative example shown in FIG. 3A, the EPG comprises a two-dimensional grid 100 which is displayed in a lower half of the television screen. In the grid, five channels (i.e. KDJT, KDUG, KJKS, KJSH, and KLSH) 102 are arranged in the vertical direction, and three times slots (i.e. 6:00 pm, 6:30 pm, and 7:00 pm) 104 are arranged in the horizontal direction. Each of the channels 102 and at least one of the time slots 104 define a cell 106 containing a program listing corresponding to a current or future program. Also, the length of each cell 106 is based on the time duration of its corresponding program. For instance, a program which is one half hour long occupies the column defined by only one time slot 104. On the other hand, a program which is an hour long occupies two columns defined two time slots 104. (For the sake of clarity, the titles of the programs are omitted from the cells 106 of the EPG illustrated in FIGS. 3A and 3B).

The upper left portion 108 of the EPG contains information regarding the currently highlighted program. In the example shown in FIG. 3A, the upper left portion 108 indicates that the cell 106 corresponding to the RUNNING WILD program broadcast on channel KJKS is highlighted on the grid 100. Namely, the information in the upper left portion 108 contains the title of the highlighted program (i.e. RUNNING WILD), the time period during which such program is broadcast (i.e. 6:00 to 8:00 pm), the channel on which the program is being broadcast (i.e. KJKS 5), and a brief description of the program. Additionally, the information displayed in such portion 108 of the EPG automatically changes when the user highlights a different program listing. Thus, the information always corresponds to the currently highlighted program listing.

The upper right portion 110 of the EPG contains a compressed version of the television program which was currently tuned by the tuner 16 when the EPG was initially displayed on the screen. If the user highlights a program listing which corresponds to a program other than the program currently being tuned by the tuner 16, the upper right portion 110 of the EPG still continues to display the compressed version of the currently tuned television program.

When the user displays the EPG by pressing the GUIDE button, the cursor highlights the program listing which corresponds to the current time and the currently tuned channel, and such program listing is located in the middle row of channels 102 and the leftmost column of time slots 104. For example, if the current time is 6:13, and the program RUNNING WILD broadcast on channel KJKS 5 is currently tuned by the tuner 16, the program listing contained in the cells 106 relating to the RUNNING WILD program is highlighted. In other words, the cells 106 defined by the time slots 6:00 pm through 7:00 pm and by the channel KJKS 5 are highlighted. In the above example, the RUNNING WILD program is actually broadcast from 6:00 pm to 8:00 pm. However, since only three time slots 104 (i.e. 6:00 pm, 6:30 pm, and 7:00 pm) can be displayed on the EPG at any given time, only the cells 106 defined by the 6:00 pm, 6:30 pm, and 7:00 pm time slots 104 are highlighted.

In order to highlight different program listings on the EPG, the user can press one or more of the four directional arrow buttons on the remote control 14. For example, if the RUNNING WILD program listing is highlighted in FIG. 3A and the user presses the up arrow button, the program listing (e.g. WORLD REPORT) corresponding to the cell 106 defined by the column corresponding to the time slot 6:00 pm and the row defined by the channel KDUG is highlighted. As indicated above, when the WORLD REPORT program listing is highlighted, the upper left portion 108 of the EPG contains a brief description of the WORLD REPORT program.

After highlighting a program listing on the EPG, the user can obtain additional information about the corresponding program by pressing the INFO key on the remote control 14. When the INFO key is pressed, the CPU 22 searches though the information stored in the RAM 28 to obtain additional program information corresponding to the highlighted program listing. Alternatively or additionally, the CPU 22 could download the additional program information from the head end 2. A program description window 112, which is the same size as the bottom portion of the EPG screen containing the program grid 100, is generated by the CPU 22 and the OSD circuit 26 and is located "behind" the program grid 100. Then, the CPU 22 and OSD circuit 26 cause the program grid 100 to "slide" off one side of the screen so that the program description window 112 is exposed, and the user is able to view the additional program information.

Figure 3B:
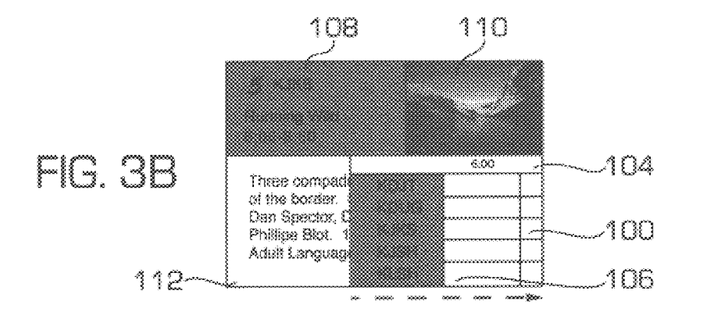
FIG. 3B illustrates the display of an initial portion of additional information on the screen according to a first embodiment of the present invention.
Figure 3C:
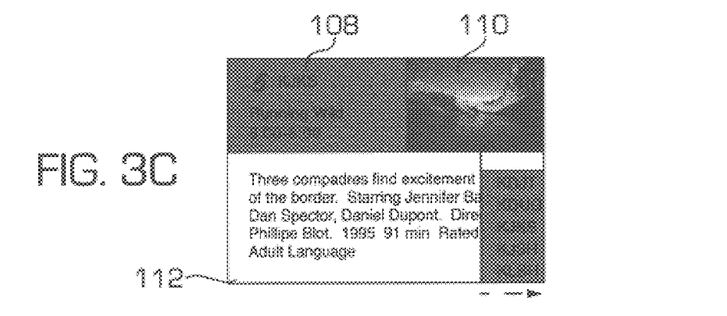
FIG. 3C illustrates the display of a subsequent portion of the additional information on the screen according to the first embodiment of the present invention.
Figure 3D:
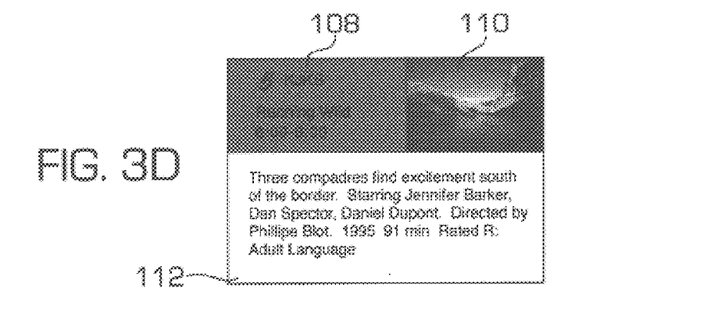
FIG. 3D illustrates the display of all of the additional information on the screen according to the first embodiment of the present invention.

FIGS. 3A to 3D show an illustrative example of how the program grid 100 of the EPG slides off the screen to expose the program description window 112. FIG. 3A shows the situation when the RUNNING WILD program listing is highlighted on the EPG immediately before the user presses the INFO key on the remote control 14. Once the INFO key is pressed, the program grid 100 begins to slide off the right side of the screen to expose the leftmost portion of the program description window 112. (FIG. 3B). The program grid 100 continues to slid off the screen (FIG. 3C) until the program description window 112 is completely exposed (FIG. 3D), and the user can easily view the additional program information. As shown in FIG. 3D, the additional program information contains a description of the plot of the program, the actors and actresses starring in the program, the director of the program, the production date of the program, the duration of the program, and the rating of the program.

As one skilled in the art will readily realize upon reading the present application, the display and relative movement between the grid 100 and window 112 in the above example (and among the EPG, grid 100, window 112, and/or broadcast program 200 in the following examples) can be accomplished by using many types of devices and/or software programs. Therefore, not only can the specific means disclosed in FIG. 2 carry out the above operation, but any other means can be used to perform the function.

Also, the manner in which the program grid 100 slides off the screen is not limited to the example above. For instance, the grid 100 can slide off the left, bottom, or top of the screen. Also, the grid 100 does not have to completely slide off the screen to expose the program description window 112 and may only need to slide partially off the screen. Additionally, the grid 100 may not slide off the screen but may "roll up" to expose the program description window 112 located underneath the grid 100. Also, the additional program information is not limited to the above information and could comprise virtually any type of information.

Figure 4A:
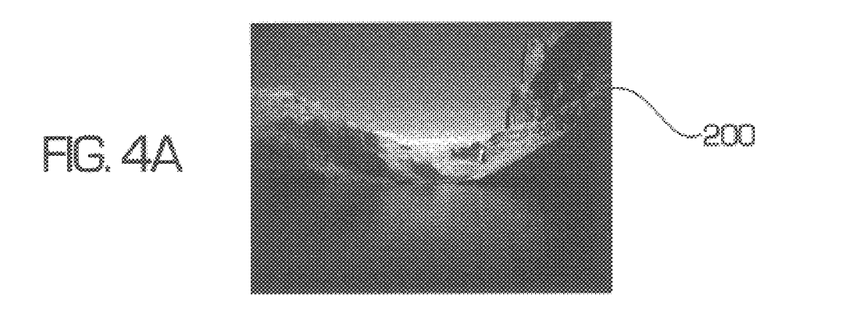
FIG. 4A illustrates a broadcast program displayed via the set top terminal shown in FIG. 2.
Figure 4B:
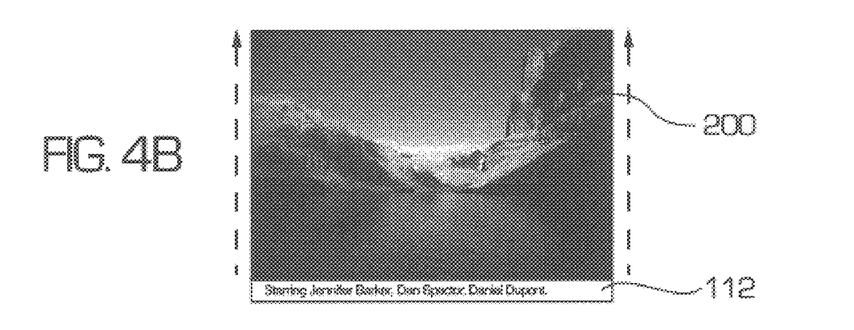
FIG. 4B illustrates the display of an initial portion of additional information on the screen according to a second embodiment of the present invention.
Figure 4C:
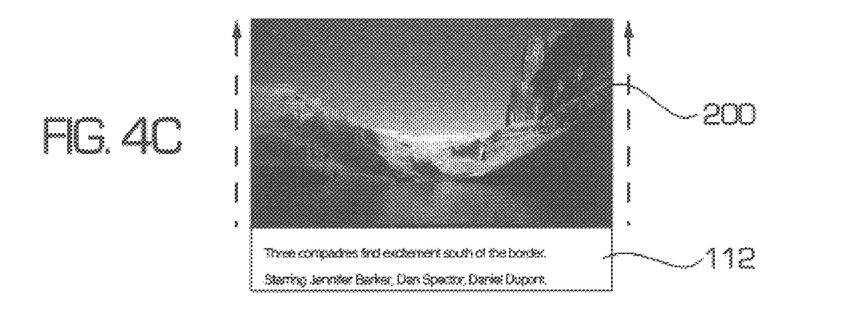
FIG. 4C illustrates the display of a subsequent portion of the additional information on the screen according to the second embodiment of the present invention.
Figure 4D:
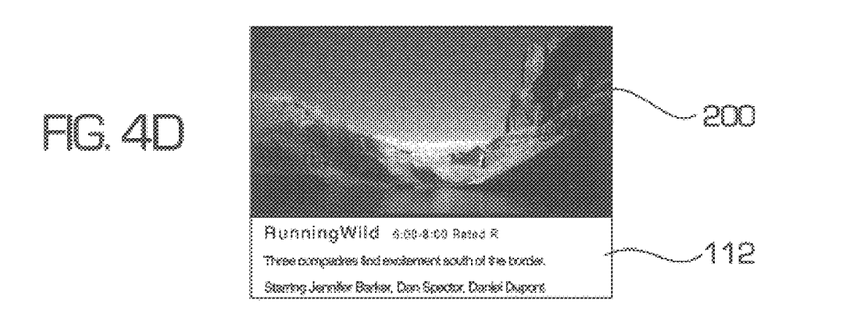
FIG. 4D illustrates the display of all of the additional information on the screen according to the second embodiment of the present invention.

In addition to being located underneath the program grid 100 of the EPG, the program description window 112 can be located underneath an actual broadcast program 200 that the user is watching. FIGS. 4A to 4D show a illustrative example in which a program description window 112 is located underneath of the RUNNING WILD broadcast program 200, and the program 200 "rolls up" to expose the window 112. FIG. 4A shows the situation when the RUNNING WILD program 200 is tuned by the tuner 16 immediately before the user presses the INFO key on the remote control 14. After pressing the INFO key, the program 200 begins to "roll up" the screen to expose the bottom portion of the program description window 112. (FIG. 4B). The RUNNING WILD program 200 continues to "roll up" the screen (FIG. 4C) until the program description window 112 is completely exposed (FIG. 4D). Obviously, the broadcast program 200 can "roll up" in any direction to expose the program description window 112. Also, the broadcast program 200 can completely roll up to expose the window 112 or can slide off the window 112 in any direction as described above.

Figure 5A:
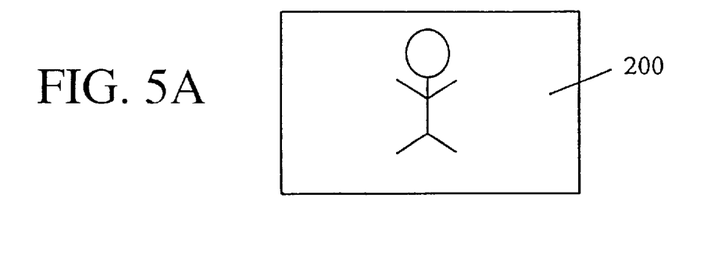
FIG. 5A illustrates a broadcast program displayed via the set top terminal shown in FIG. 2.
Figure 5B:
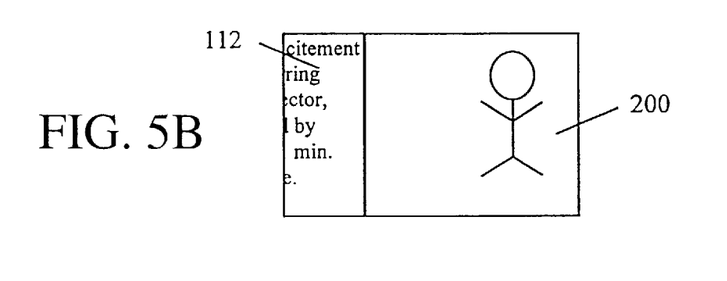
FIG. 5B illustrates the display of an initial portion of additional information on the screen according to a third embodiment of the present invention.
Figure 5C:
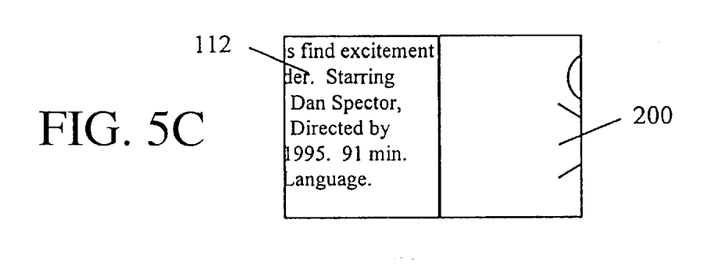
FIG. 5C illustrates the display of a subsequent portion of the additional information on the screen according to the third embodiment of the present invention.
Figure 5D:
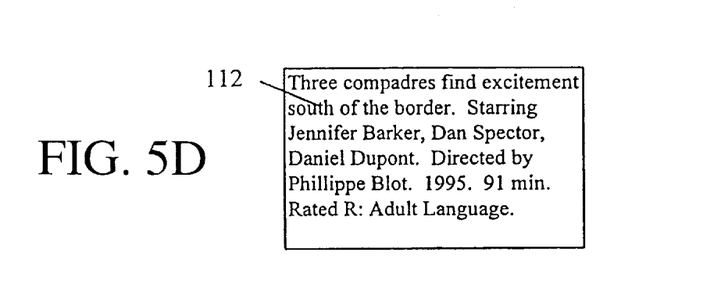
FIG. 5D illustrates the display of all of the additional information on the screen according to the third embodiment of the present invention.

In addition to exposing the program description window 112 via the above methods, FIGS. 5A to 5D show an example in which the window 112 "pushes" the broadcast program 200 off the screen. In FIG. 5A, a broadcast program 200 is displayed before the user presses the INFO key. Once the INFO key is pressed, the program description window 112 begins to push the broadcast program 200 off the right side of the screen, and the rightmost portion of the window 112 is exposed. (FIG. 5B). The program description window 112 continues to push the program 200 off the screen (FIG. 5C) until the program description window 112 moves completely onto the screen (FIG. 5D). Clearly, the program description window 112 can push the broadcast program 200 off the screen in any direction and does not necessarily have to push the broadcast program 200 completely off the screen. Also, the window 112 may be displayed by pushing the program grid 100 of the EPG or the entire EPG off the screen.

Figure 6A:
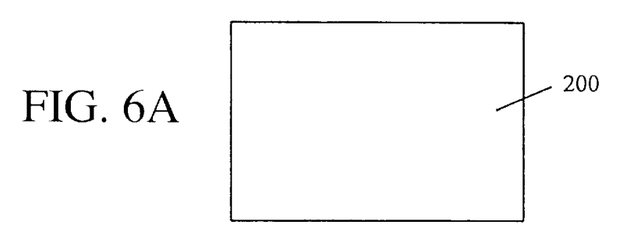
FIG. 6A illustrates a broadcast program or EPG displayed via the set top terminal shown in FIG. 2.
Figure 6B:
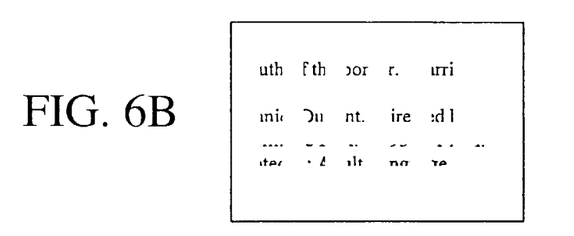
FIG. 6B illustrates the display of an initial portion of additional information on the screen according to a fourth embodiment of the present invention.
Figure 6C:
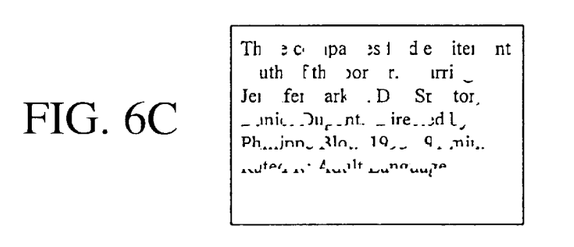
FIG. 6C illustrates the display of a subsequent portion of the additional information on the screen according to the fourth embodiment of the present invention.
Figure 6D:
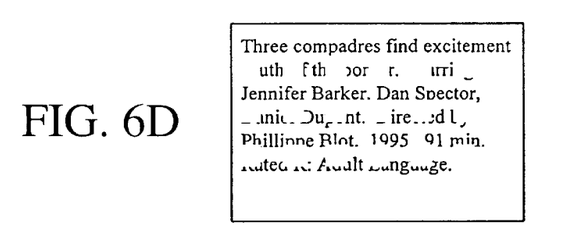
FIG. 6D illustrates the display of another subsequent portion of the additional information on the screen according to the fourth embodiment of the present invention.
Figure 6E:
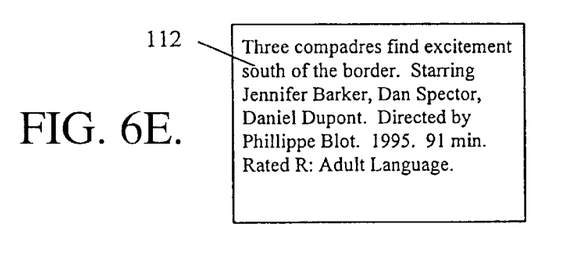
FIG. 6E illustrates the display of all of the additional information on the screen according to the fourth embodiment of the present invention.

Another manner in which the program description window 112 can be displayed is shown in FIGS. 6A to 6B. FIG. 6A shows a broadcast program 200 (or the EPG) before the INFO key is pressed on the remote control 14. As shown in FIGS. 6B to 6D, the broadcast program 200 (or the EPG) begins to disintegrate to expose the program description window 112. After a certain period of time, the entire program description window 112 is exposed. (FIG. 6E). Instead of causing the entire program 200 (or the EPG) to disintegrate, only a portion of the program 200 (or the EPG) may disintegrate to expose the window 112.

Once the program description window 112 is exposed, the user can display the whatever previous information was displayed on the television 12 before the window 112 was displayed by pressing any key on the remote control 14. After pressing any key, the previous information is restored in a manner that is opposite to the manner in which is the program description window 112 was displayed. For example, in the embodiment shown in FIGS. 3A to 3D, the program grid 100 of the EPG would slide to the left over the window 112. In the embodiment shown in FIGS. 6A to 6E, the broadcast program 200 (or the EPG) would reappear over the program description window 112 in a piecewise fashion. Alternatively, the previous information may immediately reappear in full over the program description window 112 when any key is pressed on the remote control 14. Also, the previous information may be restored by pressing a particular key (or sequence of keys) on the remote control 14 instead of any key.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. An apparatus for displaying a primary display and a window containing additional information, comprising:

a display device having a screen;

displaying means for displaying said primary display on said screen; and exposing means for generating and displaying said window containing said additional information on said screen such that said window is located underneath said primary display while said primary display is displayed on said screen and is exposed by removing said primary display from on top of said window, wherein said exposing means exposes said window by sliding said primary display at least partially off of said screen, wherein said exposing means slides said primary display in a particular direction such that said primary display exits a particular side of screen, and wherein a first portion of said window located furthest away from said particular side of said screen is exposed before a second portion of said window located closer to said particular side of said screen is exposed, wherein said primary display is a broadcast program, and wherein said additional information contained in said window relates to said broadcast program.

2. An apparatus for displaying a primary display and a window containing additional information, comprising:

a display device having a screen;

displaying means for displaying said primary display on said screen; and exposing means for generating and displaying said window containing said additional information on said screen such that said window is located underneath said primary display while said primary display is displayed on said screen and is exposed by removing said primary display from on top of said window, wherein said exposing means exposes said window by sliding said primary display at least partially off of said screen, wherein said exposing means slides said primary display in a particular direction such that said primary display exits a particular side of screen, and wherein a first portion of said window located furthest away from said particular side of said screen is exposed before a second portion of said window located closer to said particular side of said screen is exposed, wherein said primary display is a computer-generated graphic display, wherein said computer-generated graphic display contains information relating to a broadcast program, and wherein said additional information contained in said window relates to said broadcast program.

3. The apparatus as claimed in claim 1, wherein said exposing means causes said primary display to slide off of said window in response to a first command input from a user via an input device.

4. The apparatus as claimed in claim 3, wherein said exposing means ceases displaying said window in response to a second command input from said user via said input device.

5. The apparatus as claimed in claim 4, wherein said exposing means slides said primary display back on top of said window when said second command is input after said window is displayed.

6. The apparatus as claimed in claim 4, wherein said exposing means immediately and entirely redisplays said primary display when said second command is input after said window is displayed.

7. An apparatus for displaying a primary display and a window containing additional information, comprising:

a display device having a screen;

displaying means for displaying said primary display on said screen; and exposing means for generating and displaying said window containing said additional information on said screen such that said window is located underneath said primary display while said primary display is displayed on said screen and is exposed by removing said primary display from on top of said window, wherein said primary display is one of a broadcast program and a computer-generated graphic display containing information relating to said broadcast program, wherein said additional information contained in said window relates to said broadcast program, and wherein said exposing means exposes said window by rolling up at least a portion of said primary display.

8. The apparatus as claimed in claim 7, wherein said exposing means rolls up said primary display in a particular direction towards a particular side of screen, and wherein a first portion of said window located furthest away from said particular side of said screen is exposed before a second portion of said window located closer to said particular side of said screen is exposed.

9. The apparatus as claimed in claim 8, wherein said exposing means rolls up said primary display in said particular direction such that at least a portion of said primary display located furthest away from said particular side of said screen is no longer displayed.

10. The apparatus as claimed in claim 7, wherein said primary display is said broadcast program.

11. The apparatus as claimed in claim 7, wherein said primary display is said computer-generated graphic display.

12. The apparatus as claimed in claim 7, wherein said exposing means causes said primary display to roll up off of said window in response to a first command input from a user via an input device.

13. The apparatus as claimed in claim 12, wherein said exposing means ceases displaying said window in response to a second command input from said user via said input device.

14. The apparatus as claimed in claim 13, wherein said exposing means unrolls said primary display over said window when said second command is input after said window is displayed.

15. The apparatus as claimed in claim 13, wherein said exposing means immediately and entirely redisplays said primary display when said second command is input after said window is displayed.

16. An apparatus for displaying a primary display and a window containing additional information, comprising:

a display device having a screen;

displaying means for displaying said primary display on said screen; and exposing means for generating and displaying said window containing said additional information on said screen such that said window is located underneath said primary display while said primary display is displayed on said screen and is exposed by removing said primary display from on top of said window, wherein said primary display is one of a broadcast program and a computer-generated graphic display containing information relating to said broadcast program, wherein said additional information contained in said window relates to said broadcast program, and wherein said exposing means exposes said window by disintegrating at least a portion of said primary display in a piecewise fashion.

17. The apparatus as claimed in claim 16, wherein said primary display is said broadcast program.

18. The apparatus as claimed in claim 16, wherein said primary display is said computer-generated graphic display.

19. The apparatus as claimed in claim 16, wherein said exposing means causes said primary display to disintegrate off of said window in response to a first command input from a user via an input device.

20. The apparatus as claimed in claim 19, wherein said exposing means ceases displaying said window in response to a second command input from said user via said input device.

21. The apparatus as claimed in claim 20, wherein said exposing means reforms said primary display over said window in a piecewise fashion when said second command is input after said window is displayed.

22. The apparatus as claimed in claim 20, wherein said exposing means immediately and entirely redisplays said primary display when said second command is input after said window is displayed.

23. An apparatus for displaying a primary display and a window containing additional information, comprising:

a display device having a screen;

displaying means for displaying said primary display on said screen; and exposing means for generating and displaying said window containing said additional information, wherein said exposing means slides said primary display in a particular direction off said screen such that at least a portion of said primary display exits a particular side of said screen and such that at least a remaining portion of said screen is unoccupied by said primary display, wherein said exposing means slides said window onto said screen such that said window occupies at least some of said remaining portion of said screen, wherein said primary display comprises at least one of broadcast program and a computer-generated graphic display containing information relating to said broadcast program, and wherein said additional information contained in said window relates to said broadcast program.

24. The apparatus as claimed in claim 23, wherein said exposing means slides said primary display off said screen in said particular direction and slides said window onto said screen in said particular direction.

25. The apparatus as claimed in claim 24, wherein said exposing means slides said window onto said screen simultaneously when said primary display is slid off said screen, and wherein a side of said window which is closest to said particular side of said screen is disposed against a side of said primary display which is furthest from said particular side of said screen so as to give an appearance that said window pushes said primary display off said screen in said particular direction.

26. The apparatus as claimed in claim 24, wherein said primary display is said broadcast program.

27. The apparatus as claimed in claim 24, wherein said primary display is said computer-generated graphic display.

28. The apparatus as claimed in claim 24, wherein said exposing means causes said primary display to slide off said screen and causes said window to slide onto said screen in response to a first command input from a user via an input device.

29. The apparatus as claimed in claim 28, wherein said exposing means ceases displaying said window in response to a second command input from said user via said input device.

30. The apparatus as claimed in claim 29, wherein said exposing means slides said window off of said screen in a second direction which is opposite to said particular direction and slides said primary display onto said window in said second direction when said second command is input after said window is displayed.

31. The apparatus as claimed in claim 29, wherein said exposing means immediately and entirely redisplays said primary display when said second command is input after said window is displayed.

32. A method for displaying a primary display and a window containing additional information, comprising the steps of:

(a) displaying said primary display on a screen of a display;

(b) generating said window containing said additional information; and (c) displaying said window on said screen such that said window is located underneath said primary display while said primary display is displayed on said screen and is exposed by removing said primary display from on top of said window, wherein said step (c) comprises the step of:

(c1) exposing said window by sliding said primary display at least partially off of said screen, wherein said step (c1) comprises the step of:

(c1a) sliding said primary display in a particular direction such that said primary display exits a particular side of said screen, wherein a first portion of said window located furthest away from said particular side of said screen is exposed before a second portion of said window located closer to said particular side of said screen is exposed, wherein said primary display is a broadcast program, and wherein said additional information contained in said window relates to said broadcast program.

33. A method for displaying a primary display and a window containing additional information, comprising the steps of:

(a) displaying said primary display on a screen of a display;

(b) generating said window containing said additional information; and (c) displaying said window on said screen such that said window is located underneath said primary display while said primary display is displayed on said screen and is exposed by removing said primary display from on top of said window, wherein said step (c) comprises the step of:

(c1) exposing said window by sliding said primary display at least partially off of said screen, wherein said step (c1) comprises the step of:

(c1a) sliding said primary display in a particular direction such that said primary display exits a particular side of said screen, wherein a first portion of said window located furthest away from said particular side of said screen is exposed before a second portion of said window located closer to said particular side of said screen is exposed, wherein said primary display is a computer-generated graphic display, wherein said computer-generated graphic display contains information relating to a broadcast program, and wherein said additional information contained in said window relates to said broadcast program.

34. The method as claimed in claim 32, wherein said step (c1a) comprises the steps of:

(c1a1) inputting a first command from a user via an input device; and (c1a2) causing said primary display to slide off of said window in response to said first command.

35. The method as claimed in claim 34, further comprising the step of:

(d) ceasing to display said window in response to a second command input from said user via said input device.

36. The method as claimed in claim 35, wherein said step (d) comprises the step of:

(d1) sliding said primary display on top of said window when said second command is input after said window is displayed.

37. The method as claimed in claim 35, wherein said step (d) comprises the step of:

(d1) immediately and entirely redisplaying said primary display when said second command is input while said window is displayed.

38. A method for displaying a primary display and a window containing additional information, comprising the steps of:

(a) displaying said primary display on a screen of a display;

(b) generating said window containing said additional information; and (c) displaying said window on said screen such that said window is located underneath said primary display while said primary display is displayed on said screen and is exposed by removing said primary display from on top of said window, wherein said primary display is one of a broadcast program and a computer-generated graphic display containing information relating to said broadcast program, wherein said additional information contained in said window relates to said broadcast program, and wherein said step (c) comprises the step of:

(c1) exposing said window by rolling up at least a portion of said primary display.

39. The method as claimed in claim 38, wherein said step (c1) comprises the step of:

(c1a) rolling up said primary display in a particular direction towards a particular side of screen, wherein a first portion of said window located furthest away from said particular side of said screen is exposed before a second portion of said window located closer to said particular side of said screen is exposed.

40. The method as claimed in claim 39, wherein said step (c1a) comprises the step of:

(c1a1) rolling up said primary display in said particular direction such that at least a portion of said primary display located furthest away from said particular side of said screen is no longer displayed.

41. The method as claimed in claim 38, wherein said primary display is said broadcast program.

42. The method as claimed in claim 38, wherein said primary display is said computer-generated graphic display.

43. The method as claimed in claim 38, wherein said step (c1) comprises the steps of:

(c1a) inputting a first command from a user via an input device; and (c1b) causing said primary display to roll up off of said window in response to said first command.

44. The method as claimed in claim 43, further comprising the step of:

(d) ceasing to display said window in response to a second command input from said user via said input device.

45. The method as claimed in claim 44, wherein said step (d) comprises the step of:

(d1) unrolling said primary display back on top of said window when said second command is input after said window is displayed.

46. The method as claimed in claim 44, wherein said step (d) comprises the step of:

(d1) immediately and entirely redisplaying said primary display when said second command is input after said window is displayed.

47. A method for displaying a primary display and a window containing additional information, comprising the steps of:

(a) displaying said primary display on a screen of a display;

(b) generating said window containing said additional information; and (c) displaying said window on said screen such that said window is located underneath said primary display while said primary display is displayed on said screen and is exposed by removing said primary display from on top of said window, wherein said primary display is one of a broadcast program and a computer-generated graphic display containing information relating to said broadcast program, wherein said additional information contained in said window relates to said broadcast program, and wherein said step (c) comprises the step of:

(c1) exposing said window by disintegrating at least a portion of said primary display in a piecewise fashion.

48. The method as claimed in claim 47, wherein said primary display is said broadcast program.

49. The method as claimed in claim 47, wherein said primary display is said computer-generated graphic display.

50. The method as claimed in claim 47, wherein said step (c1) comprises the steps of:

(c1a) inputting a first command from a user via an input device; and (c1b) causing said primary display to disintegrate off of said window in response to said first command.

51. The method as claimed in claim 50, further comprising the step of:

(d) ceasing to display said window in response to a second command input from said user via said input device.

52. The method as claimed in claim 51, wherein said step (d) comprises the step of:

(d1) reforming said primary display over said window in a piecewise fashion when said second command is input after said window is displayed.

53. The method as claimed in claim 51, wherein said step (d) comprises the step of:
   (d1) immediately and entirely redisplaying said primary display when said second command is input after said window is displayed.

54. A method for displaying a primary display and a window containing additional information, comprising the steps of:
   (a) displaying said primary display on a screen of a display;
   (b) generating said window containing said additional information;
   (c) sliding said primary display in a particular direction off said screen such that at least a portion of said primary display exits a particular side of said screen and such that at least a remaining portion of said screen is unoccupied by said primary display; and
   (d) sliding said window onto said screen such that said window occupies at least some of said remaining portion of said screen;
   wherein said primary display comprises at least one of broadcast program and a computer-generated graphic display containing information relating to said broadcast program, and
   wherein said additional information contained in said window relates to said broadcast program.

55. The method as claimed in claim 54, wherein said step (d) comprises the step of:
   (d1) sliding said window onto said screen in said particular direction.

56. The method as claimed in claim 55, wherein said step (d1) comprises the step of:
   (d1a) sliding said window onto said screen simultaneously when said primary display is slid off said screen,
   wherein a side of said window which is closest to said particular side of said screen is disposed against a side of said primary display which is furthest from said particular side of said screen so as to give an appearance that said window pushes said primary display off said screen in said particular direction.

57. The method as claimed in claim 55, wherein said primary display is a broadcast program.

58. The method as claimed in claim 57, wherein said additional information contained in said window relates to said broadcast program.

59. The method as claimed in claim 55, wherein said primary display is a computer-generated graphic display.

60. The method as claimed in claim 59, wherein said computer-generated graphic display contains information relating to a broadcast program, and
   wherein said additional information contained in said window relates to said broadcast program.

61. The method as claimed in claim 56, wherein said step (c) comprises the steps of:
   (c1) inputting a first command from a user via an input device; and
   (c1) causing said primary display to slide off of said window in response to said first command.

62. The method as claimed in claim 61, further comprising the step of:
   (e) ceasing to display said window in response to a second command input from said user via said input device.

63. The method as claimed in claim 62, wherein said step (e) comprises the step of:
   (e1) sliding said window off of said screen in a second direction which is opposite to said particular direction and sliding said primary display onto said window in said second direction when said second command is input after said window is displayed.

64. The method as claimed in claim 62, wherein said step (e) comprises the step of:
   (e1) immediately and entirely redisplaying said primary display when said second command is input after said window is displayed.

65. An apparatus for displaying information relating to a selected broadcast program, comprising:
   a display device having a screen; and
   a controller that controls the display of a primary display on said screen, wherein said primary display is one of said selected broadcast program and a graphic display containing information about said selected broadcast program,
   wherein a secondary display containing additional information relating to said selected broadcast program is located underneath said primary display,
   wherein, in response to a user input from a user, said controller automatically exposes said secondary display on said screen by removing said primary display at least partially off of said secondary display so that said additional information can be viewed by said user,
   wherein said selected broadcast program is selected by said user, and
   wherein said controller automatically exposes said secondary display in response to and after said user input is input by at least one of the following operations:
      (1) sliding said primary display off of said secondary display,
      (2) rolling said primary display off of said secondary display, and
      (3) disintegrating said primary display off of said secondary display.

66. The apparatus as claimed in claim 65, wherein said primary display is said selected broadcast program.

67. The apparatus as claimed in claim 65, wherein said primary display is said graphic display.

68. The apparatus as claimed in claim 67, wherein said graphic display comprises schedule information relating to scheduled broadcasts of a plurality of broadcast programs, and
   wherein said selected broadcast program is one of said plurality of broadcast programs.

69. The apparatus as claimed in claim 68, wherein said user can input at least one selection input to select said schedule information relating to said selected broadcast program, and
   wherein, after selecting said schedule information relating to said selected broadcast program, said user can input said user input to instruct said controller to display said secondary display.

70. The apparatus as claimed in claim 65, wherein said controller exposes said secondary display by sliding said primary display off of said secondary display.

71. The apparatus as claimed in claim 70, wherein, in response to and after said user input is input, said controller automatically and completely exposes said secondary display.

72. The apparatus as claimed in claim 70, wherein said primary display is at least partially slid off of said screen.

73. The apparatus as claimed in claim 65, wherein said controller exposes said secondary display by rolling said primary display off of said secondary display.

74. The apparatus as claimed in claim 73, wherein, in response to and after said user input is input, said controller automatically and completely exposes said secondary display.

75. The apparatus as claimed in claim 65, wherein said controller exposes said secondary display by disintegrating said primary display off of said secondary display.

76. The apparatus as claimed in claim 75, wherein, in response to and after said user input is input, said controller automatically and completely exposes said secondary display.

77. An apparatus for displaying information relating to a selected broadcast program, comprising:

a display device having a screen; and a controller that controls the display of a primary display on said screen, wherein said primary display is one of said selected broadcast program and a graphic display containing information about said selected broadcast program, wherein, in response to a user input from a user, said controller controls the display of a secondary display on said screen, wherein said secondary display contains additional information relating to said selected broadcast program, wherein, in response to said user input, said controller automatically slides said primary display across said screen in a particular direction and simultaneously slides said secondary display onto said screen in said particular direction so as to give an appearance that said secondary display pushes said primary display.

78. The apparatus as claimed in claim 77, wherein said secondary display pushes said primary display at least partially off of said screen.

79. The apparatus as claimed in claim 78, wherein said primary display is said selected broadcast program.

80. The apparatus as claimed in claim 78, wherein said primary display is said graphic display.

81. The apparatus as claimed in claim 65, wherein said user input is generated when said user presses a certain button on a control device.

82. The apparatus as claimed in claim 77, wherein said user input is generated when said user presses a certain button on a control device.

* * * * *